US007603476B1

(12) United States Patent
Hofmann et al.

(10) Patent No.: US 7,603,476 B1
(45) Date of Patent: Oct. 13, 2009

(54) PSEUDO-SYNCHRONOUS MESSAGING

(75) Inventors: Christoph Hofmann, Wiesloch (DE); Peter Surma, Heidelberg (DE); Stefan Rossmanith, Walldorf (AT); Andreas Dahl, Rauenberg (DE)

(73) Assignee: SAP AG, Walldorf (DE)

( * ) Notice: Subject to any disclaimer, the term of this patent is extended or adjusted under 35 U.S.C. 154(b) by 807 days.

(21) Appl. No.: 10/677,112

(22) Filed: Sep. 30, 2003

Related U.S. Application Data (60) Provisional application No. 60/433,327, filed on Dec. 13, 2002.

(51) Int. Cl.
*G06F 15/16* (2006.01)
(52) U.S. Cl. .................. 709/237; 709/232; 709/236
(58) Field of Classification Search .......... 709/237, 709/232, 236
See application file for complete search history.

(56) References Cited

U.S. PATENT DOCUMENTS

| | | | | |
|---|---|---|---|---|
| 5,604,487 A | * | 2/1997 | Frymier | 340/5.9 |
| 5,654,969 A | * | 8/1997 | Wilhelmsson | 370/460 |
| 6,477,590 B1 | * | 11/2002 | Habusha et al. | 710/29 |
| 6,772,216 B1 | * | 8/2004 | Ankireddipally et al. | 709/230 |
| 6,857,023 B2 | * | 2/2005 | Rivadalla et al. | 709/230 |
| 7,010,607 B1 | * | 3/2006 | Bunton | 709/228 |
| 7,032,111 B1 | * | 4/2006 | Ruutu et al. | 713/160 |
| 7,065,580 B1 | * | 6/2006 | Eberle et al. | 709/232 |
| 2003/0120802 A1 | * | 6/2003 | Kohno | 709/237 |
| 2003/0135640 A1 | * | 7/2003 | Ho et al. | 709/237 |
| 2003/0163589 A1 | * | 8/2003 | Bunce et al. | 709/250 |
| 2003/0177259 A1 | * | 9/2003 | Wookey et al. | 709/237 |
| 2004/0003106 A1 | * | 1/2004 | Cunningham et al. | 709/234 |

OTHER PUBLICATIONS

Socolofsky et al. "RFC 1180—A TCP/IP Tutorial"; Network Working Group, Jan. 1991.*
Hinden et al. "RFC 1883—Internet Protocol, Version 6 (IPv6) Specification"; Network Working Group, Dec. 1995.*
Yakovlev et al. "Designing an asynchronous pipeline token ring interface"; Second Working Conference on Asynchronous Design Methodologies, 1995. Proceedings, May 1995, On pp. 32-41.*
MicrosoftTechNet; "Data Flow in the OSI Model"; Windows 2000 Server Resource Kit; http://www.microsoft.com/technet/prodtechnol/windows2000serv/reskit/cnet/cnfh_osi_gilv.mspx?mfr=true.*

* cited by examiner

*Primary Examiner*—Vivek Srivastava
*Assistant Examiner*—Lin Liu
(74) *Attorney, Agent, or Firm*—Mintz, Levin, Cohn, Ferris, Glovsky and Popeo, P.C.

(57) ABSTRACT

A system and method are disclosed for pseudo-synchronous communication in an asynchronous messaging network. The system includes a forward pipeline for transmitting asynchronous request messages from a sender system to the receiver system, and a backward pipeline for transmitting asynchronous acknowledgement messages from the receiver system to the sender system. Each acknowledgement message includes a reference to a request message and a result of an event associated with the request message.

25 Claims, 6 Drawing Sheets

PSEUDO-SYNCHRONOUS MESSAGING

CROSS REFERENCE TO RELATED APPLICATIONS

This application claims priority to U.S. Provisional Patent Application No. 60/433,327, filed on Dec. 13, 2002.

BACKGROUND

The following description relates to business systems, for example an exchange infrastructure for collaborative business systems.

Asynchronous communication is widely used for message transmissions between applications in a heterogeneous system landscape. One type of transport mechanism for asynchronous message transmission is known simply as "store and forward," in which an asynchronous request message that is sent from a sending application, or "sender," makes its way from node to node through a network, and eventually reaches a receiving application, or "receiver." At each node in the network, the message is stored for duplicate recognition and error correction, and then forwarded to the next node in the transmission path. The message eventually arrives at the intended receiver where the message can be processed.

The sender of an asynchronous message request, however, may not know the result of either the transmission or the receiver processing of the request, or whether there were any errors during transport. Thus, the sender may need to send duplicate messages in order to ensure receipt of important messages, or that processing can eventually be completed.

SUMMARY

This document discloses a computer-implemented method and system for pseudo-synchronous communications in an asynchronous messaging network. In one implementation, a pseudo-synchronous communication system includes a forward pipeline for transmitting asynchronous request messages from a sender system to the receiver system, and a backward pipeline for transmitting asynchronous acknowledgement messages from the receiver system to the sender system. Each acknowledgement message includes a reference to a request message and a result of an event associated with the request message.

In another implementation, asynchronous request messages are communicated through a network in a "store-and-forward" mechanism in which a message is persisted (i.e. stored in a database) at each node in a communication path in a network as it traverses the network from node to node. The asynchronous request messages include one or more requests for acknowledgements, where each request relates to a certain set of events associated with the request message. Such events include the receipt of the message, and/or the successful processing of the message by the designated receiver system. When the event occurs, in accordance with a protocol described herein an asynchronous acknowledgement message is generated and transmitted back to the sender system along substantially the same path as the request message. The acknowledgement message includes a reference to the request message, whereby they messages can be associated with each other at each node along the path.

Acknowledgement messages can be routed along a backwards pipeline using a Hoplist generated from the associated request message along a forwards pipeline. In another implementation, request messages can be split to be transmitted to multiple receivers, each of which can generate an acknowledgement message that is combined at one or more nodes along the backwards pipeline. Thus, the sender will receive acknowledgements informing about the corresponding events at each of the receivers.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

DETAILED DESCRIPTION

The systems and techniques described here relate to generating and transmitting acknowledgements to events related to asynchronous request messages communicated between applications through an enterprise application integrator hosted by an exchange infrastructure (XI).

Figure 1:
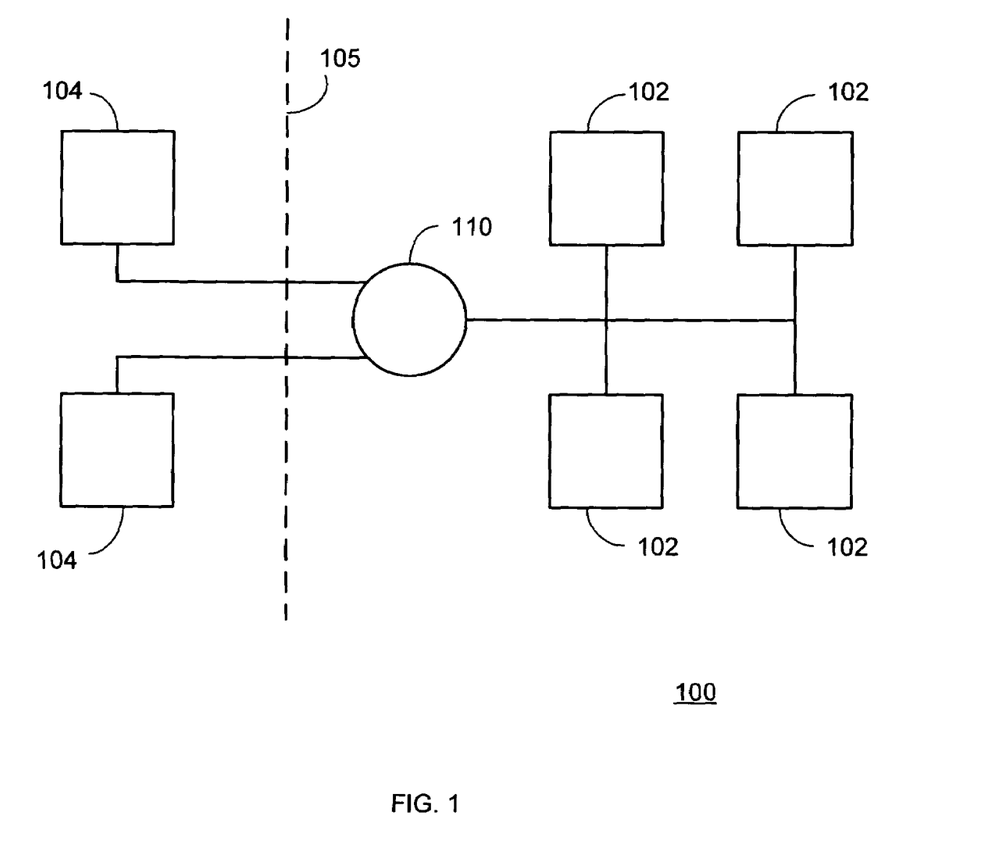
FIG. 1 is a block diagram of an exchange system for integrated, message-based collaboration.

FIG. 1 is a simplified block diagram of a system 100 for integrating applications through message-based interaction. The system 100 includes an XI 110 for collaborative processing among internal components (ICs) 102 of an enterprise, and between external components (ECs) 104 that communicate to one or more ICs 102 through a firewall 105. The ICs and ECs 102 and 104 may represent any of a number of processes or services and their software and hardware, such as Web portals, buying or selling programs, electronic mail, business management programs, project planning programs, etc., and are preferably Web-based applications. Each of the ICs/ECs 102, 104 communicates via messaging with one or more other components according to one or more of various communication protocols or standards.

The XI 110 is a self-contained, modularized exchange platform for driving collaboration among the components 102, 104. The XI 110 includes a central integration repository and directory storing shared collaboration knowledge. The XI 110, which supports open standards such as various standard markup languages like the extensible markup language (XML), web service description language (WSDL), and simple object access protocol (SOAP), provides an abstraction of technical interfaces for the components 102, 104, and for message-based communications across heterogeneous component interfaces. The self-contained, modularized functions of the XI 110 can be provided as one or more Web services based on standard Internet technology, and therefore can be published, discovered, and accessed within a network of components 102, 104 using open standards.

Figure 2:
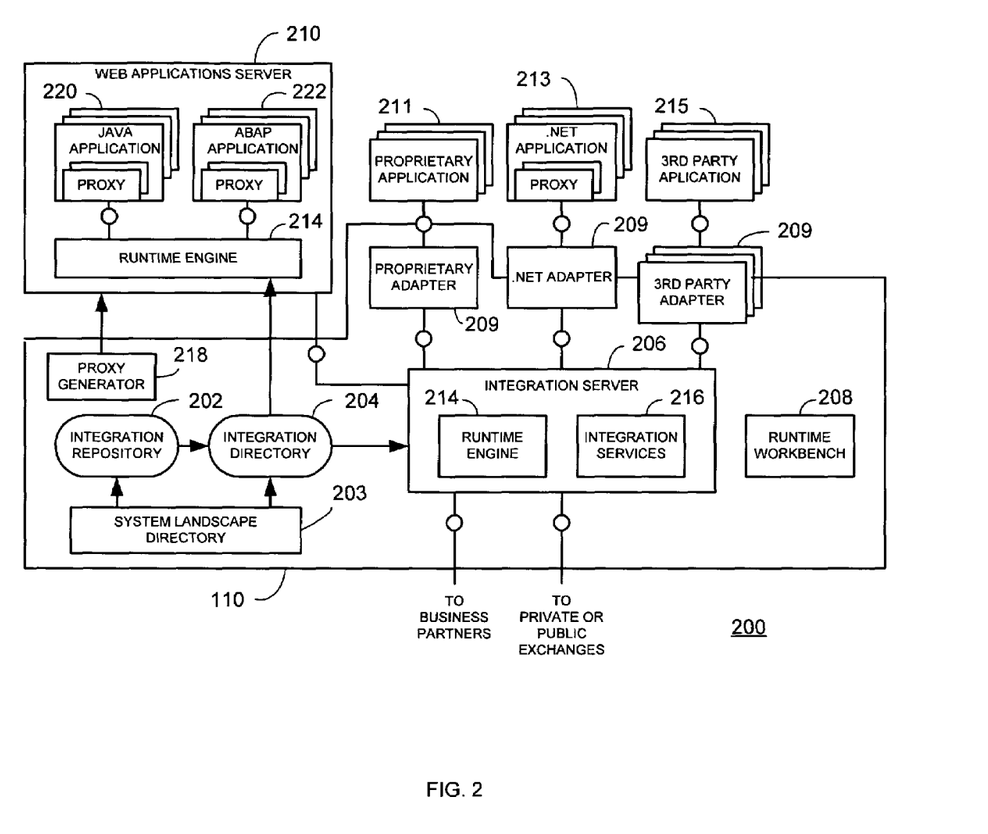
FIG. 2 is a block diagram of an exchange infrastructure.

FIG. 2 illustrates a system landscape 200 including an XI 110 for facilitating message-based collaboration among applications. The exchange infrastructure 110 includes an integration repository 202, an integration directory 204, a system landscape directory 203, and an integration server 206. The integration repository 202 captures design-time collaboration descriptions of software components that can communicate via the XI 110. The integration directory 204 captures configuration-specific collaboration descriptions of the system landscape 200 at runtime, which includes accessing actual component installations from the system landscape directory 203 and connectivity descriptions for external components, all of which represent the shared business semantics of the system landscape 200. The integration server 206 uses the shared business semantics at runtime to execute message-based collaboration among the active software components.

The integration server 206 includes a runtime engine 214 that provides messaging and business process control at runtime for connecting services and managing the process flow of value chains. The integration server 206 can also include integration services 216 that typically require an application-specific implementation, such as analytics and master data services, for example. Like the integration repository 202 and integration directory 204, the integration server 206 is configured for deployment within any existing system infrastructure. The integration server 206 may be implemented as a dedicated server that applies the shared collaboration knowledge of the integration directory 204 of the supported system landscape in a runtime collaboration environment. A runtime workbench 208 allows organizations or users to manage the reliable operation of the XI 110.

The XI 110 also includes various adapters 209 that provide connectivity between the integration server 206 and proprietary applications 211, Web-based services 213, and third party applications 215. The XI 110 can also include Web application server 210 that provides Web-based applications programmed according to standard computing platforms using web-specific programming languages such as Java and ABAP, for instance. The Web applications server 210 also includes an instance of the runtime engine 214 for providing messaging and business process control between Web-based applications such as Java applications 220 and ABAP applications 222, and other components.

Communication or calls to external software components can be enabled by using a proxy that allows the interface for the software component to be implemented locally in the XI 110. Proxies make the communication technology stack transparent to applications, and present an application with a programming language-dependent interface. The proxies can be generated by a proxy generator 218 based on information stored on the integration repository 202. The proxy generator 218 uses the interface information described via a standard Web-based language such as WSDL and XSDL to create platform- and programming language-dependent code in the application development system. The communication logic can be implemented within the proxy that represents the interface description of the respective development platform, such as Java, ABAP, and .NET for the web-based applications 213. The proxies convert platform-specific data types into XML and provide access to the component-specific local integration engine. On the outbound side, proxies are generated completely. Outbound proxies can be called via a service invocation provided by an application's developer. On the inbound side, only proxy skeletons need to be generated which must be further implemented by the receiving application.

Figure 3:
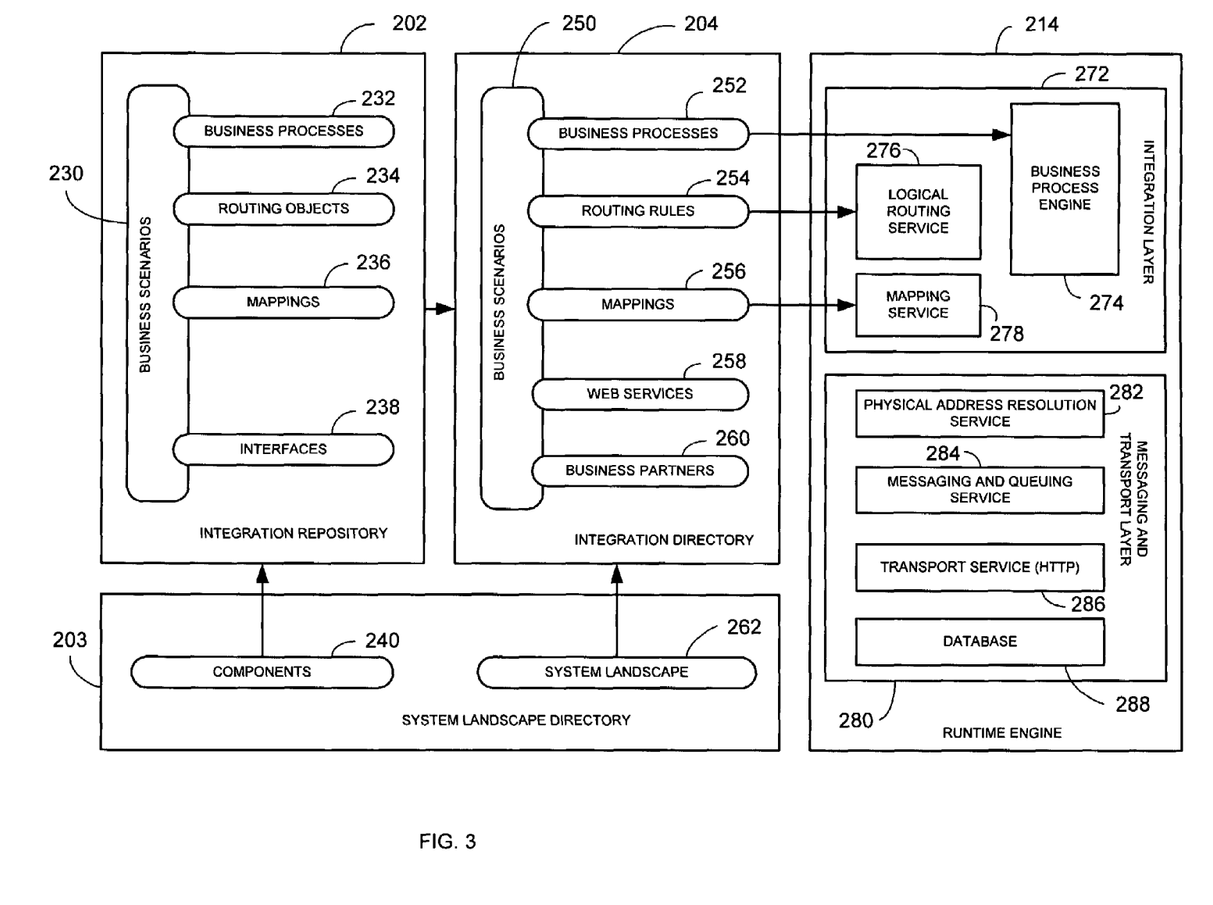
FIG. 3 is a block diagram of an integration repository, integration directory, and runtime engine for collaborative processing.

FIG. 3 illustrates the integration repository 202, the system landscape directory 203, the integration directory 204 and an instantiation of the runtime engine 214 in greater detail. The integration repository 202 includes design-time business processes 232, routing objects 234, mappings 236, and interfaces 238, all of which are defined according to one or more business scenarios 230. The integration repository 202 accesses descriptions of all software components 240 in the system landscape from the system landscape directory 203. The business scenarios 230 of the integration repository 202 describe and configure message-based interaction between application components or enterprises. An enterprise can select one or more business scenarios described in the integration repository 202 as a best practice for rapid configuration of the XI 110.

The business processes 232 can be implemented as extensible compound Web services executed using a business process engine 274. Each business process 232 is modeled centrally in the integration repository 202, and can be defined to the detail of user interaction steps. A company or user designs each business process 232 according to its business needs, independently of the technical implementation. There may be several categories of business process templates: i.e. generic business processes, industry-specific processes, and company-specific processes, for example. Each process identifies the Web services that are needed and that must be interconnected. In one specific implementation, business processes 232 are defined using a graphical interface, and then stored in a standardized format like Business Process Modeling Language (BPML). The business process engine can then interpret these models and execute them to drive collaboration among software components.

Routing objects 234 are pointers that point to a specific part of a message. They are predefined criteria to determine potential receivers of messages that must be distributed between components and business partners during collaborative processing. Information about the routing objects is used for receiver determination. The integration repository 202 includes interface descriptions of all message interfaces 238 of all versions of all software components. The message interfaces 238 are composed of message types that are in turn composed of data types. Mappings 236 define required transformations between message interfaces 238. These transformations cover structural conversions and value mappings. Structural conversions are used for semantically equivalent types that are syntactically or structurally different, whereas value mapping may be used when an object is identified by different keys in multiple systems. In a specific implementation, a graphical mapping tool is provided to assist in mapping, and transforming data is based on the Extensible Stylesheet Language Transformation (XSLT) or Java code.

The integration repository 202 is the central point of entry for interface development, storage and retrieval, and includes interfaces 238 that describe all message interfaces of all software components in the system landscape. Accordingly, the interfaces 238 can be implemented on any software component using any technology. In one implementation, the interfaces 238 are based on WSDL. Message interfaces are made up of message types, which are in turn made up of data types. The data types can be described using XML Schema Definition Language (XSDL). An example of a data type is "address," which is used in the message type "Create PO" and can be reused for the message type "Create Invoice." Interfaces 238 can be arranged according to any classification, such as inbound and outbound, or synchronous and asynchronous.

The components 240 represent component descriptions that include information about application components, as well as information relating to their dependencies on each other. In a specific implementation, the component descriptions are based on the standard Common Information Model (CIM) of the Distributed Management Taskforce. Since the integration repository 202 includes design-time information, it uses only component-type information, independent of actual installation, that is stored as components 240 in the system landscape directory 203. The component descriptions can be added using an API or interactively using a graphical user interface.

The integration directory 204 details information from the integration repository 202 that is specific to the configuration of each component as installed in the system. The configuration-specific collaboration descriptions of the integration directory 204 can be generated automatically from content in the integration repository 202 or manually by a user using a graphical user interface. In one implementation, the integration directory 204 is built on a Java platform and its content is represented via XML using open Internet standards. The integration repository 202 can be upgraded without affecting the integration directory 204 or any runtime collaborative processes. The user then decides which changes should be transferred to the integration directory 204, either as predetermined automatic upgrades or manually via graphical tools.

The integration directory 204 includes configuration-specific descriptions of business scenarios 250, business processes 252, routing rules 254, and executable mappings 256. The integration directory 204 also includes descriptions of active Web services 258, and active business partners 260. The integration directory 204 uses a description of the active system landscape 262 from the system landscape directory 203. The business scenarios 250 in the integration directory 204 represent the overall view of the interaction among interfaces and mappings 256 in the context of the actual configuration relevant for the specific implementation. The business processes 252 represent an executable description of all active business processes.

The routing rules 254 determine the receivers of a message on a business level. In one specific implementation, the content of a message is used as a routing rule 254. Other parameters may also be used. Relevant input parameters include the sender, the sender message type, the message to identify the receivers, and the receiver message type. The routing rules 254 can be described declaratively using XML Path Language (Xpath, i.e. by using a graphical tool) or can be coded in Java or use routing objects 234. The integration engine 214 at runtime accesses information on the routing rules 254.

The routing rules 254 may use logical terms to describe senders and receivers in order to separate them from the physical address provided by the Web services 258 described in the integration directory 204. The physical address can therefore be changed without changing business-oriented content. Mappings 256 in the integration directory 204 represent mappings required in the active system landscape, in contrast to the integration repository mappings 236 that contains all supported mappings. Some new entries however, such as a new sequence of mappings, can be made only in the integration directory 204 to address additional Web services for mapping, for example. The integration engine 214 accesses the integration directory mappings 256 at runtime.

Web services 258 describe interfaces implemented within the current active system landscape, as well as active Web services supported by described business partners 260. As such, information describing Web services 258 can be exchanged with UDDI-compatible directories or added manually. Each Web service 258 description also provides physical addressing details, access information, and other special attributes such as uniform resource locator (URL), protocol, and security information. In one implementation, the Web services 258 are described in WSDL, and SOAP and ebXML are used as messaging protocols. The integration engine 214 accesses information about the Web services 258 at runtime as well.

The system landscape 262 of the system landscape directory 203 describes the current system landscape that uses the XI 110. The system landscape 262 describes which components are installed and available on certain machines within the system, which instance or client was chosen, further information on the installed components, other system landscapes, and so on. The system landscape 262 description is based on an open architecture and can adhere to any widely accepted standard such as CIM. Thus, many proprietary and third party components can be configured to automatically register themselves in the system landscape 262 upon being installed within the actual system landscape. Access interfaces to the system landscape 262 description can be based on open standards as well, such as the Web-based Enterprise Management (WBEM) and SOAP standards.

Business partners 260 defines information for business partners of an enterprise, such as names, addresses, and URLs, but may also contain more detailed and sophisticated information. For instance, the business partners 260 may include a description of the message formats that can be directly received and processed, or of security protocols used for safe communications, or trading terms that are employed in the partnership. The kind of information stored in business partners 260 can be governed by enterprise-specific decisions of the enterprise using the XI 110.

The integration directory 204 and the runtime engine 214 form a collaborative runtime environment for executing collaborative business processes. The collaborative runtime environment provides all runtime components relevant for exchanging messages among the connected software components and business partners. The integration server 206 executes within the collaborative runtime environment or within Web application server 210, either of which can include an instance of the runtime engine 214.

The runtime engine 214, which exchanges all messages between the various interconnected components, includes two layers: an integration layer 272 and a messaging and transport layer (MTL) 280. The integration layer 272 includes a business process engine 274 executing centrally modeled business processes, a logical routing service 276 and a mapping service 278. The MTL 280 provides a physical address resolution service 282, a messaging and queuing service 284, a transport service 286 via HTTP, and a database 288. The integration services 216 in the integration server 206 can support the runtime engine 214. An MTL 280 is also included in each instantiation of the runtime engine 214 in Web applications servers 210, as well as in each adapter 209 of the adapter framework connecting to various software components. Each MTL 280 has a role in the execution of the EO protocol, as will be explained further below.

At runtime, business processes 252 are instantiated and executed by the business process engine 274, which executes the respective Web services described in Web services 258 independent of their location according to the business process model. The business process engine 274 is independent of the semantics of the executed business processes 252, and is configured as a mediator and facilitator for business processes 252 to interact with technical components of the runtime system landscape.

Figure 4:
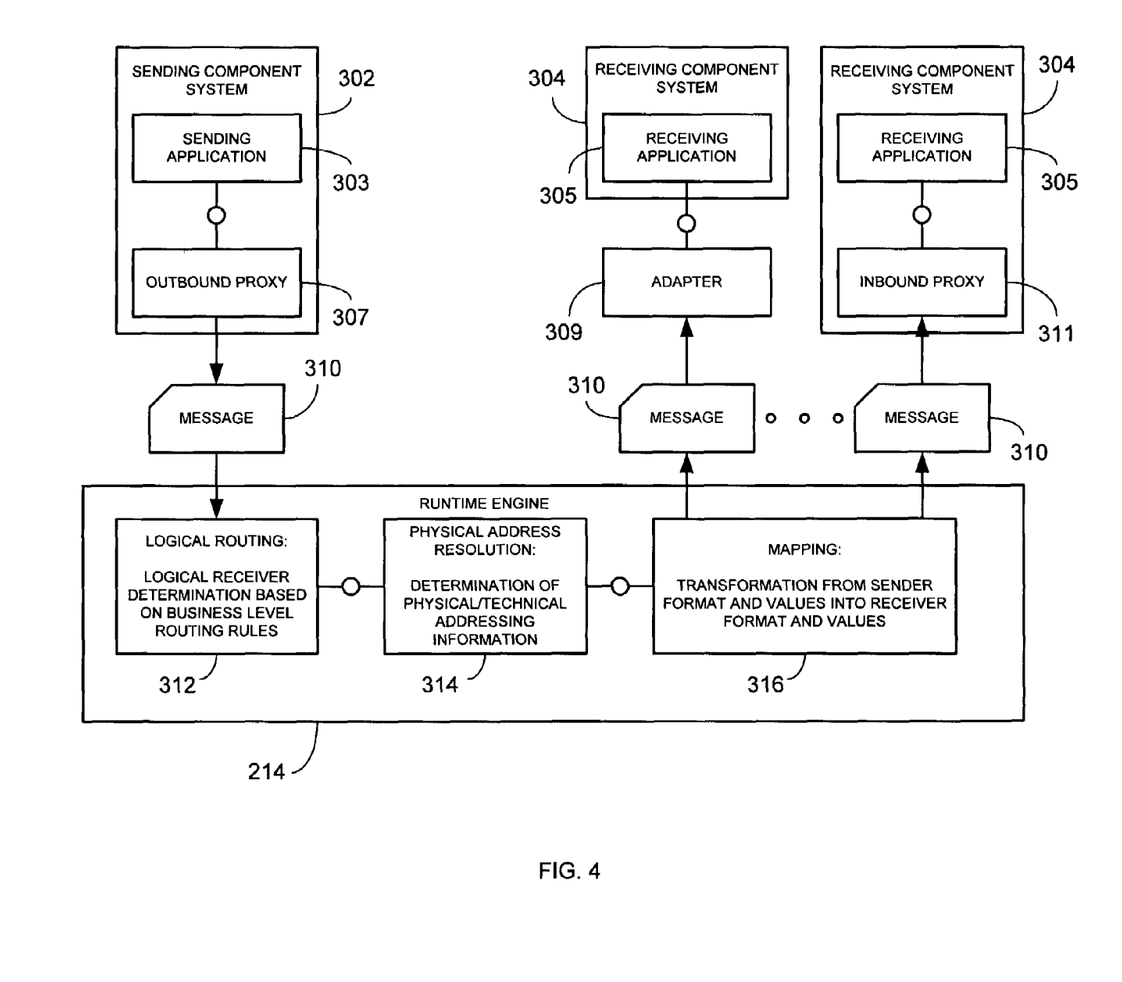
FIG. 4 is a block diagram of system for transmitting a message using a runtime engine of the exchange infrastructure.

FIG. 4 is a block diagram illustrating several functions of the runtime engine 214 in a process of exchanging a message between applications. A sending application 303 resides in a sending component system 302, which represents the hardware and software platform of the sending application 303. One or more receiving applications 305 each reside in a receiving component system 304. A communication path for a message 310 can include an outbound proxy 307 at the outbound interface from the sending component system 302, through the runtime engine 214 and adapter 309 to the receiving component system 304. A receiving component system 304 may also utilize an inbound proxy 311 rather than an adapter. The configuration and connectivity of the shown receiving component systems 304 is merely exemplary, and it should be noted that such configuration and connectivity could take any number of forms. The pictured example illustrates both asynchronous and synchronous communication. In synchronous communication, routing and physical address resolution is only needed for the request, as the response is transferred to the sender directly over the same channel used for the request.

With reference also to FIGS. 2 and 3, for a given message the logical routing service 276 uses information on the sending application and the message interface to determine receivers and required interfaces by evaluating the corresponding routing rules, as shown at 312. The routing rules are part of the configuration-specific descriptions of the runtime system landscape provided by the integration directory 204, and can be implemented as Xpath expressions or Java code. The mapping service 316 determines the required transformations that depend on the message, sender, and sender interface, as well as the receiver interface.

After retrieving the required mapping from the integration directory 204, the mapping service 278 can either execute XSLT mappings or Java code (or any combination in a given sequence) to the content of the sent message. Below the integration layer, the messaging and queuing services 284 move the message to the intended or required receiver(s). After the message is transformed into the format expected by each receiver, the physical address of the required receiver service and other relevant attributes are retrieved from the integration directory 204 at 314, and mapped to the message at 316.

A queuing engine in the messaging and queuing service 284 stores ingoing, outgoing, erroneous, and work-in-progress messages persistently. The messaging layer of the runtime engine 214 provides queuing functions for the physical decoupling of application components and guarantees messages are delivered exactly once according to a protocol (i.e. the "EO protocol"). The transport service 286 enables the runtime engine 214 to act as both an HTTP client and server. The transport service 286 implements an HTTP client that enables outbound communication and an HTTP server that handles inbound communication by accepting incoming documents. Additional server functions can address situations in which the receiver has no HTTP server.

Figure 6:
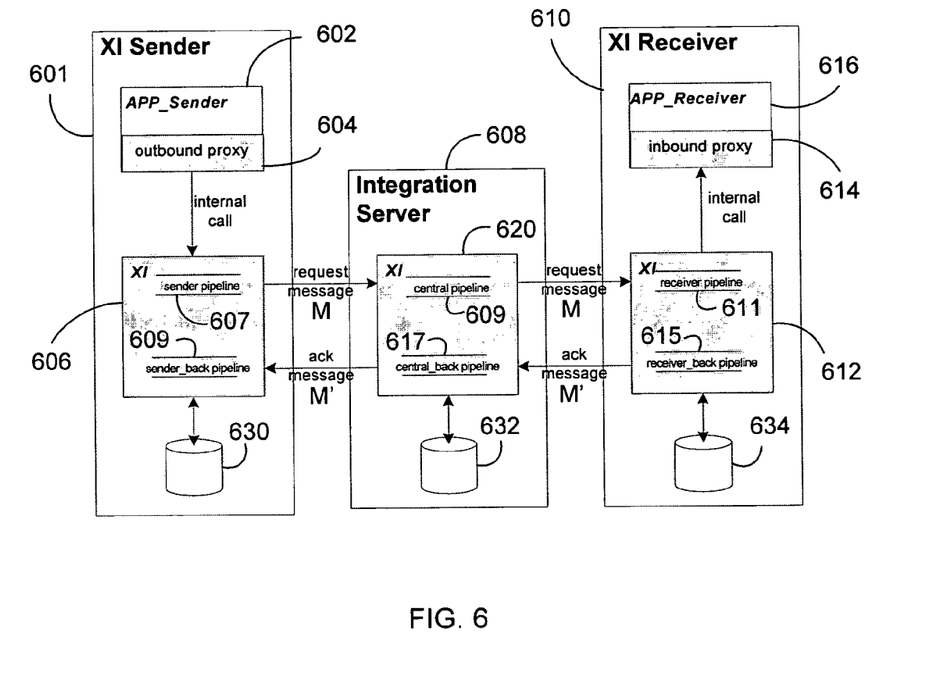
FIG. 6 is a block diagram of a store and forward message communication system having forward and backward asynchronous pipelines.

FIG. 6 illustrates an example store and forward mechanism for exactly-once message transport using pipelines SENDER 607, CENTRAL 609, and RECEIVER 611 which provide a request path within the XI engines. In an XI sender system 601, a sender application 602 sends an asynchronous request message via an outbound proxy 604. With an internal call, the outbound proxy 604 calls into its local XI engine 606, which includes the SENDER pipeline 607 for transmitting the request to the integration server 608. A copy of the message is stored in database 630 for duplication and reexecution in case of an error, before it is transmitted to the integration server 608. The integration server 608 includes an XI engine 620 having the CENTRAL pipeline 609 that performs integration services like mapping and routing, and which forwards the request message to an XI engine 612 running in the receiver system 610. The integration server 608 also stores a copy of the message in a database 632 for duplication and reexecution in case of error. The XI engine 612 running in the receiver system 610 includes a receiver pipeline 611 that stores another copy of the message in database 634, and calls an inbound proxy 614 that receives the request message and executes the corresponding application code 616 in the receiver system 610.

The store and forward mechanism implies that the sender application 602 continues its own processing after the request message has been stored in the local SENDER pipeline 607 of the XI engine 606. Thus, the sender application 602 does not maintain control of the request message and has no information whether the message has been received by the receiver system 610, and/or whether the message has been successfully processed by the receiving application 616. In order to inform the sender about these relevant events during processing of the request message, an acknowledgement protocol is used.

Figure 5:
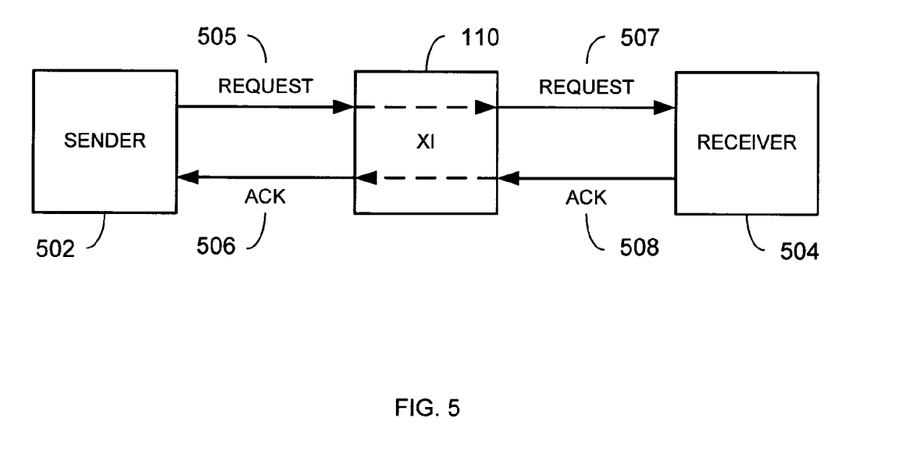
FIG. 5 is a block diagram of an asynchronous message exchange infrastructure having forward and backward pipelines.

FIG. 5 illustrates a general protocol and mechanism for acknowledgement messages via the XI 110. Generally, an acknowledgment message is an asynchronous message that refers to an asynchronous request message, and is used to inform a sender of the request message of an event related to the request message. Acknowledgements (ACKs) 506 and 508 include a reference to a corresponding asynchronous request message (REQUEST) 505, 507, respectively. Central to the function of processing acknowledgement messages in the XI runtime is the use of backward pipelines for each participating component. A transmission path used by the request messages 505 and 507 constitutes a forward pipeline; a transmission path used by the corresponding acknowledgement messages 506 and 508 constitutes a backward pipeline.

In one implementation, a request message from a sender 502 can designate whether and what kind of acknowledgement should be sent back to the sender 502. One type of ACK 506, 508 indicates that a REQUEST 505, 507 has been received in the receiver 504. Another type of ACK 506, 508 indicates that a REQUEST 505, 507 has been successfully processed by the receiver 504. Each ACK 506, 508 includes the result, with data, concerning the associated relevant event. For an application error in the receiver 504, additional fault data may be sent in an ACK 506, 508. The ACKs 506, 508 are transported in the same way as REQUESTS 505 and 507 (i.e. using the EO protocol over HTTP), but using different processing of the backwards pipeline, such as backwards routing.

For each asynchronous request message, the sender application 602 can set a flag in a header of the request message indicating a request for an acknowledgment to the event(s) related to the request message. An acknowledgment to the event(s) will be a newly generated message that includes a result and associated data about the relevant event, and a reference to the message id of the request message in the message header. Thus, the related messages, i.e. the request and the associated acknowledgement, will be logically connected.

According to the header, the request message provides information indicating whether an acknowledgement message is to be sent back, and what information this acknowledgment message is to contain, i.e., the sender system 601 may identify the type of acknowledgment message that is expected. In another implementation, a request for an acknowledgement can be set according to a configuration in the integration directory connected with the integration server 608.

One type of acknowledgement message is a transport-ACK to indicate that the request message has been received by the receiver system 610. Another type of acknowledgement message is an application ACK to indicate that the request message has been successfully processed by the receiving application 616. Thus, the request message header may contain two or more different flags that indicate whether a transport or an application acknowledgment is requested. In a specific example, these flags may be contained in a new SOAP (or other transport protocol) header element AcknowledgmentHeader.

If a transport acknowledgement is requested, and the request message (M) is received by the XI engine 612 on the receiver system 610 and stored in the database 634, the XI engine 612 triggers the acknowledgement protocol. A corresponding application acknowledgement (M') is generated, stored in the database 634 and scheduled for processing within the pipeline RECEIVER_BACK 615. According to the acknowledgement protocol, acknowledgement message M' is similar to the associated request message M, but includes a new message ID and a reference to the message ID of the message M. In its transport from the receiver system 610 to the sender system 601, the acknowledgement message is processed by the corresponding backward pipelines CENTRAL_BACK 617 and SENDER_BACK 609 with XI engines 620 and 606, respectively, and stored in databases 632 and 630. The traversed systems are marked as read in a WasRead element in a HopList tag of the acknowledgement message, as will be explained in greater detail below.

If an application acknowledgement is requested, the XI engine 612 on the receiver system 610 triggers the acknowledgement protocol after the internal call of the inbound proxy 614. A corresponding application acknowledgement message M' is generated containing the status of the proxy call (indicating "successful application execution" or "application error"). The acknowledgement message M' is stored in the database 634 and its processing is scheduled within the backwards pipeline RECEIVER_BACK 615. The processing then continues substantially as described in the previous section.

If an error occurs during processing of an asynchronous request message (e.g. a routing error), the sender system 601 is also informed via an acknowledgment message possessing status SystemError, provided that an acknowledgment has been requested. This implies that the processing of such an acknowledgement message is triggered when such a system error occurs. A system error may also occur when processing an acknowledgement message, but a further acknowledgement is not generated because this more fundamental error is to be solved locally where the error occurred. Moreover, a newly-generated error acknowledgement probably would experience the same error.

As discussed above, adapters can be used to connect other, mostly older, "message technologies" (such as RFC, Idoc, etc.) to the XI integration server 608 and perform transformations from external protocols to the XI protocol and vice versa. An inbound adapter can be employed between an external sender system outside the XI integration server 608 and its XI engine 620. The inbound adapter forwards the request message from the external sender to the XI engine 620 and sends back an acknowledgement from the XI engine 620 to the external sender. An outbound adapter can be employed between the XI engine 620 and an external receiver system. The outbound adapter forwards the request message from the XI engine 620 to the external receiver system.

For acknowledgement message, the inbound and outbound adapters switch roles, as an acknowledgement message travels back from the external receiver system to the external sender system. In other words, an acknowledgement message is sent into the integration server 608 by the outbound adapter and forwarded to the external sender system by the inbound adapter. The functions of the inbound and outbound adapters can be separated, as there can be cases where a message uses adapters of different protocols on the inbound and outbound side.

On the request path, the inbound adapter sets the corresponding acknowledgment request within the message header of the request message according to the external protocol from the external sender. This is based mainly on the sender-side programming model and protocol, however there are technologies where an acknowledgment message is never expected (e.g. RFC) or where the sender has no control of whether acknowledgments are sent back (e.g. Idoc). In both cases, an acknowledgment request will not be set in the AcknowledgmentHeader tag of the request message. Upon the arrival of an acknowledgment from the XI integration server 608, this message is sent back to the sender application 602. The acknowledgment status and attached data can be converted so that the original sender system 601 understands the acknowledgment message.

Also on the request path, an outbound adapter has to transform the acknowledgment requests into an external protocol of a receiver technology related to the adapter. The outbound adapter sends a TransportAckNotPossible or Application AckNotPossible message if it is not able to generate an acknowledgement for at least one event of the corresponding TransportAckRequest or ApplicationAckRequest event sets in a semantically correct way. Upon the arrival of an acknowledgment from the external receiver system 610, the outbound proxy 604 (or adapter) must be able to accept an acknowledgment and transform it to a correct XI acknowledgment message so that its semantics are preserved. Data attached to the acknowledgment message are then transformed into the XI internal data types.

If the adapter discovers that no real acknowledgment message can be sent back, it sends back an acknowledgment with status TransportAckNotPossible or ApplicationAckNotPossible, respectively. Otherwise, the correct acknowledgment will be sent back. If it is not possible to know whether an acknowledgment will be sent back, the sender system 601 may wait for an acknowledgment until a timeout mechanism is activated.

Depending on the acknowledgment requested, and the relevant acknowledgment event that occurs, an acknowledgment state can be set in the acknowledgment message denoting the outcome of the acknowledgment event. This acknowledgment status can be contained in an AcknowledgmentHeader tag. The following are examples of acknowledgment states (the letters T and A denote whether this state refers to a transport or an application acknowledgment):

ApplicationOk (A): Request message processed correctly in the application.

ApplicationError (A): Request message processed with error in the application.

MessageCancel (T, A): Processing of request message canceled after error.

SystemErrorRequest (T, A): System error during processing of request message.

TransportOk (T): Request message arrived correctly in final receiver system.

TransportAckNotPossible (T): outbound adapter does not support transport acknowledgments.

ApplicationAckNotPossible (A): outbound adapter does not support application acknowledgments.

When a requested event is to be acknowledged with an acknowledgment message, the acknowledgement message may be sent back over the same XI engines and infrastructure from the receiver to the sender that the corresponding request message traversed from the sender to the receiver. Therefore, measures can be taken so that the path taken by the request message can be determined. In one example, a new SOAP header element named HopList may be provided where every XI system component (i.e. central integration server 608, local integration engine 620, and inbound and outbound adapters or proxies) appends information about its own system and processing, so that the appropriate information is provided to the acknowledgment message for the backwards routing to the sender system 601.

Whenever a requested acknowledgment event occurs during the processing of the request message, a corresponding acknowledgment message is generated and scheduled for sending back to the sender system. In an example, this acknowledgement message can have a newly generated message ID, but can also include the message ID of the request message in a RefToMessageId tag. Furthermore, a tag in the header of the acknowledgement message, such as the Direction tag of the SOAP header MessageHeader, can include the value Response. The HopList SOAP header of the request message is copied into the acknowledgement message so that the backwards routing of the acknowledgement message can be performed. When traveling backwards according to the HopList, the corresponding element of the HopList is marked as read when the message arrives in the respective XI system.

An acknowledgement should include the event on which it has been generated. This can be a simple status string such as TransportOK or ApplicationError, etc. In case of either a successful or erroneous application execution, the acknowledgement may have attached application data in its payload. These data should then be mapped back accordingly on the integration server on its way back to the sender.

In one embodiment, the receiver system 610 sends an acknowledgment message back to a dedicated integration server 608 as configured for each local integration engine 614. Note that this dedicated integration server 608 need not be the integration server that has sent the request message to the receiver system 610. In this case, an alternative protocol for multi-hub backwards routing can be used as described below, because the integration server is not recorded as the previous hop in the Hoplist and the originally-used integration server is not marked as WasRead.

According to the alternative protocol, the last unmarked hop in the hoplist of an acknowledgment message may be the proxy sender of the request message itself when the acknowledgment message is processed on the integration server to which the corresponding request message has been sent. This hop contains the name of the sender system 601, and this name is used for performing the logical and technical backwards routing (back pipeline services 615, 617, 619).

As discussed above, to accommodate the processing of acknowledgment messages, backwards pipelines for each XI system (XI sender, integration server, and XI receiver) are provided. The acknowledgment messages are processed in the backwards pipelines in the same manner as asynchronous request messages are in the forward pipelines: the messages are stored in a database 634, 632 and 630 as they are sent from system to system, and from which databases their processing is scheduled. The backward pipelines transmit acknowledgment messages to each predecessor system: i.e. the receiver system 610 sends an acknowledgement back to the XI Integration server 608, the XI integration server 608 sends an acknowledgement back to the sender system 601. Once received in the sender system 601, the acknowledgment message is stored in any database and can be read from the sender application 602 via polling or other mechanism. Additionally, the sender application 602 can be notified by sender back pipeline 619 when an acknowledgement message arrives.

A message split may be performed on the central pipeline 609 in the integration server 608, in which an original message is stopped and several child messages with new message ID's are generated. Each of the child messages include a reference to the original parent message. The sender may not know that the request message has been split up, therefore several alternatives exist for providing this information back to the sender system 601 in the proxy case. In one alternative, only the parent message is sent back with a corresponding status saying that the message has been split up, and the child messages are not acknowledged. In another alternative, each of the child messages are acknowledged, and acknowledgments are collected on the runtime engine 620 in which the split occurs. Whenever the acknowledgments are complete, a corresponding message containing an accumulated acknowledgment can be sent back to the sender system 601.

Alternatively, an acknowledgment message related to the parent message can include the message ID's of all child messages, and be sent back to the sender application 602. The acknowledgments of the children are sent back to the sender application 602 as if the sender application 602 was the original sender of all generated child messages. By this technique, acknowledgements to the message that is split are transported back transparently to the sender as if the message split has taken place on the sender system 601. In still yet another alternative, only child messages are acknowledged and the acknowledgments are sent back to the sender system 601 including data of the all message splits of its predecessors. Thus, the complete split tree can be reconstructed in the sender system 601 based on a receipt of all child acknowledgments.

In one implementation, a request message header includes two extension tags: one tag indicating that an acknowledgement is requested and including the corresponding event status; and another tag including the hoplist that is recorded in the request message. In one example, the message is a SOAP-compliant message, and the SOAP header includes an AcknowledgementHeader tag and a HopList header tag. For asynchronous request messages, the Acknowledgment-Header tag may include two optional element tags: ApplicationAcknowledgmentRequested and TransportAcknowledgmentRequested, having a value that denotes that an application and a transport acknowledgment message are requested, respectively.

For acknowledgement messages, the Acknowledgment-Header tag should contain the AcknowledgmentStatus element having one of the status values described above. This element may possess an optional AcknowledgmentType attribute with two possible values, System or Application, denoting that the acknowledgment message originated from the XI system processing or the application processing at the receiver system, respectively.

The following is an example of an Acknowledgment-Header tag informing about the successful transport of the corresponding request message to the receiver system:

<SAP:AcknowledgmentHeader xmlns:SAP="http://sap.com/exchange/MessageFormat"xmlns:SOAP="http://schemas.xmlsoap.org/soap/envelope/"SOAP:must Understand="1" version="1.0">
<SAP:TransportAcknowledgementRequested>true</SAP:TransportA cknowledgementRequested>

<SAP:AcknowledgmentStatusAcknowledgment
Type="System">TransportOk</SAP:
AcknowledgmentStatus>
</SAP:AcknowledgmentHeader>

In the example, the HopList tag includes a list of several Hop element tags, where each Hop element denotes an XI system component. A Hop element can have the following attributes: a SystemName representing the business system name attached to the respective hop (integration server, integration engine, or adapter); a Type representing the name of the internal XI pipeline; a Timestamp representing the time at which the Hop entry was written into the HopList; and a WasRead attribute, which can be set to a first value such as false in the request message, and set to a second value such as true when the acknowledgment message arrives at the respective hop.

Furthermore, each hop may contain a MessageInbound and a MessageOutbound tag, where each tag includes information about the inbound and the outbound side of the message processing, i.e. the inbound and the outbound adapter, the systems from which the message came and to which it is sent, etc. Both tags may include the following sub tags: a MessageID representing the message ID contained in the message header when the message arrived at the hop and when the message left the hop, respectively; a Type representing the inbound and outbound adapter type from which the message came and to which the message sent, respectively; and an AdapterRefID string that each adapter may use for internal purposes specific to the adapter technology.

A Hop tag may include a list of Branch elements when a branching of a message has taken place at a hop. Each Branch element denotes a child message generated during the execution of the branching. Each Branch element can include a MessageId representing the new message ID of the child message.

The following is an example of a Hoplist tag containing exactly one Hop element:

```
<SAP:HopList xmlns: SAP="http://sap.com/exchange/
    MessageFormat"Version="1.0">
    <SAP:  Hop  SystemName="Integration_Server_
        YA1_1OO"Type="CENTRAL"  TimeStamp=
        "2002-09-10T09:18:10Z"WasRead="false">
    <SAP:MessageInbound>
        <SAP:Type>PROXY</SAP:Type>
        <SAP:MessageId>FFB47D3D-9 DB2-4AO7-E100-
            00000A114ABBc/SAP:MessageId>
    </SAP:MessageInbound>
    <SAP:Branch  MessageId="53087C3D-3073-1910-
        E100-
    <SAP:Branch  MessageId="54087C3D-3073-1910-
        E100-
    <SAP:MessageOutbound>
        <SAP:Type>IENGINEc/SAP:Type>
        <SAP:MessageId>53087C3D-3073-1910-E100-
            00000A114ABBc/SAP:MessageId>
    </SAP:MessageOutbound>
</SAP:Hop>
</SAP:HopList>
```

While the foregoing describes message formats that are compliant with XML, it should be understood that other languages and formats may be used within the scope of this description. In yet another implementation, application payloads may be attached to ApplicationOK and ApplicationError acknowledgements, and such payloads can be mapped in the backwards pipeline as described below.

Various implementations of the systems and techniques described here can be realized in digital electronic circuitry, integrated circuitry, specially designed application-specific integrated circuits (ASICs), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a backend component (e.g., as a data server), or that includes a middleware component (e.g., an application server), or that includes a frontend component (e.g., a client computer having a graphical user interface or a Web browser through which a user can interact with an implementation of the systems and techniques described here), or any combination of such backend, middleware, or frontend components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Although a few embodiments have been described in detail above, other modifications are possible. Other embodiments may be within the scope of the following claims.

The invention claimed is:

1. A computer-implemented communication method, comprising:
providing one or more requests for acknowledgement in an asynchronous request message transmitted from an application-level of a sender system, wherein each request for acknowledgement corresponds to at least one event related to the request message, the asynchronous request message for enterprise application-level processing of the asynchronous request message at a receiver system, the request message being in a format in accordance with extensible markup language format;

transmitting the request message with the one or more requests for acknowledgement to the receiver system, the receiver system being an enterprise system providing services, the request to request one or more of the services of the receiver system to process the asynchronous request message, and the transmitting the request message comprising transmitting the request message in an exchange infrastructure for communication among components of collaborative business systems, the components comprising the sender system and the receiving system;

splitting, at one or more network components between the sender system and the receiver system, the request message that is transmitted into two or more child messages, wherein each child message includes the one or more requests for acknowledgement; and receiving an acknowledgment message responsive to the request message and related to each child message, the acknowledgement message received, based on the split, are transported transparently to the sender system, the acknowledgement message being an application-level message sent by the receiver system of the request message, the acknowledgement message being in a format in accordance with extensible markup language format, the acknowledgement message sent to the sender system of the request message, and the acknowledgement message having different types, each type characterizing an application state, the application states comprising:

a state indicating the request message was processed correctly in an application of the receiver system, a state indicating the request message processed with error in the application of the receiver system, a state indicating processing of the request message canceled after error, a state indicating a system error occurred during processing of the request message, and a state indicating an outbound adapter of the receiver system does not support application acknowledgments.

2. The method in accordance with claim 1, wherein requesting an acknowledgement includes setting a flag in a header of the request message.

3. The method in accordance with claim 2, wherein the flag is set in a header of the asynchronous request message.

4. The method in accordance with claim 1, wherein the event includes a system error during transport of the request message to the receiver system.

5. The method in accordance with claim 1, wherein the event includes the receipt of the request message by the receiver system.

6. The method in accordance with claim 1, wherein the event includes the successful processing of the request message by an application associated with the receiver system.

7. The method in accordance with claim 1, wherein the event includes the erroneous processing of the request message by an application associated with the receiver system.

8. The method in accordance with claim 1, further comprising generating the acknowledgement message upon completion of the event.

9. The method in accordance with claim 8, further comprising transmitting the acknowledgement message to the sender system.

10. The method in accordance with claim 1, further comprising:

generating a hoplist that includes a list of network components through which the request message is transmitted; and transmitting an acknowledgement message related to each request for acknowledgement through network components corresponding to the hoplist.

11. The method in accordance with claim 1, wherein the asynchronous request message comprises a plurality of requests comprising a first request for acknowledgement of a state of processing of the asynchronous request message at a software application of the receiver system and each of the requests is to result in a separate acknowledgment message.

12. The method in accordance with claim 11, wherein the first request is a request for acknowledgement of whether the software application failed to process the message.

13. The method in accordance with claim 1, wherein the components are web-based applications.

14. The method in accordance with claim 1, wherein the transmitting of the asynchronous request message is initiated by an outbound proxy call to an exchange engine to transmit the asynchronous request message to an exchange infrastructure server, the exchange infrastructure stores duplicates of the asynchronous request message for re-execution in case of error, and an application of the sender system that causes the call of the outbound proxy continues processing information other than the asynchronous request message without an acknowledgment from the receiver system of status of the call.

15. A computer-implemented communication method for acknowledging one or more events related to an asynchronous request message sent from a sender system to a receiver system, the method comprising:

receiving an asynchronous request message from the sender system, the asynchronous request message being an enterprise application-level message;

wherein transmitting the asynchronous request message from the sender system to the receiver system further comprises splitting, at one or more network components between the sender system and the receiver system, the request message that is transmitted into two or more child messages, wherein each child message includes the one or more requests for acknowledgement;

determining, based on the asynchronous request message, whether an acknowledgement to an event associated with the asynchronous request message is requested; and if an acknowledgement to the event associated with the asynchronous request message is requested, transparently transmitting an asynchronous acknowledgement message related to each child message based on the split, to the sender system upon occurrence of the event, wherein the asynchronous acknowledgement message includes a result of the event and a reference to the asynchronous request message, the asynchronous acknowledgement message having different types, each type characterizing an application state, the application states comprising:

a state indicating the asynchronous request message was processed correctly in an application of the receiver system, a state indicating the asynchronous request message processed with error in the application of the receiver system, a state indicating processing of the asynchronous request message canceled after error, a state indicating a system error occurred during processing of the asynchronous request message, and a state indicating an outbound adapter of the receiver system does not support application acknowledgments.

16. The method in accordance with claim 15, wherein the event corresponds to one or more events selected from the event group that consists of:
the receipt of the asynchronous request message by the receiver system;
a system error during transport of the request message to the receiver system;
the successful processing of the request message; and/or
the erroneous processing of the request message.

17. The method in accordance with claim 15, wherein the asynchronous acknowledgement message is generated by the receiver system, and further comprising receiving the asynchronous acknowledgement message from the receiver system.

18. The method in accordance with claim 17, further comprising matching the asynchronous acknowledgement message with the associated asynchronous request message.

19. The method in accordance with claim 18, wherein matching the asynchronous acknowledgement message with the associated asynchronous request message includes comparing the reference to the asynchronous request message with a message ID of a copy of the asynchronous request message.

20. The method in accordance with claim 15, wherein determining whether the sender system requests an acknowledgement to an event associated with the asynchronous request message includes reading a flag in a header of the asynchronous request message.

21. The method in accordance with claim 20, wherein the flag is set by the sender system.

22. A system for asynchronous communication between a sender system and a receiver system, comprising:
a forward pipeline for transmitting asynchronous request messages from the sender system to the receiver system, the asynchronous request messages being enterprise application-level messages;
splitting, at one or more network components between the sender system and the receiver system, the request message that is transmitted into two or more child messages, wherein each child message includes the one or more requests for acknowledgement; and
a backward pipeline for transparently transmitting asynchronous acknowledgement messages related to event associated with each child message based on the split, from the receiver system to the sender system, wherein each acknowledgement message includes a reference to a request message and a result of an event associated with the request message, the asynchronous acknowledgement messages having different types, each type characterizing an application state, the application states comprising:
a state indicating an asynchronous request message was processed correctly in an application of the receiver system,
a state indicating the asynchronous request message processed with error in the application of the receiver system,
a state indicating processing of the asynchronous request message canceled after error,
a state indicating a system error occurred during processing of the asynchronous request message, and
a state indicating an outbound adapter of the receiver system does not support application acknowledgments.

23. The system in accordance with claim 22, further comprising an enterprise application integrator hosted on a server, and wherein the forward pipeline includes a first HTTP connection from the sender system to the server and a second HTTP connection from the server to the receiver system.

24. The system in accordance with claim 22, wherein the backward pipeline includes a first HTTP connection from the receiver system to the server and a second HTTP connection from the server to the sender system.

25. The system in accordance with claim 22, further comprising a database associated with the forward and backward pipelines, for storing a copy of each transmitted request message and each transmitted acknowledgement message.

* * * * *

UNITED STATES PATENT AND TRADEMARK OFFICE
CERTIFICATE OF CORRECTION

| | | |
|---|---|---|
| PATENT NO. | : 7,603,476 B1 | Page 1 of 1 |
| APPLICATION NO. | : 10/677112 | |
| DATED | : October 13, 2009 | |
| INVENTOR(S) | : Hofmann et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1125 days.

Signed and Sealed this

Fifth Day of October, 2010

David J. Kappos
*Director of the United States Patent and Trademark Office*